Patented Feb. 7, 1928.

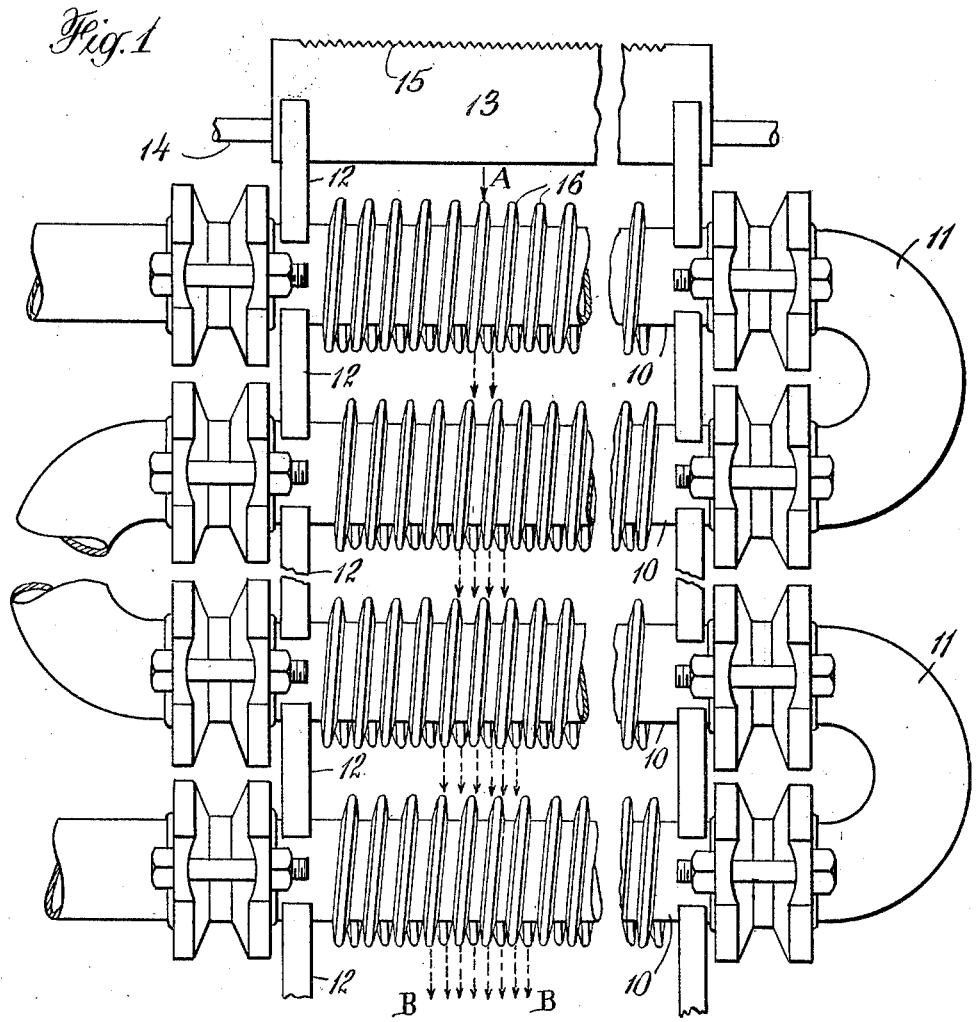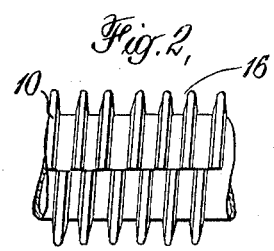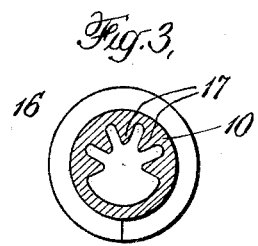

1,658,025

UNITED STATES PATENT OFFICE.

CLIVE MORRIS ALEXANDER, OF WAXAHACHIE, TEXAS.

HEAT-TRANSFER APPARATUS.

Application filed December 15, 1923. Serial No. 680,803.

This invention relates to heat transfer apparatus. More particularly, this invention relates to apparatus in which heat is transferred through a pipe or tube to a heat transfer vehicle flowing over the exterior of the pipe or tube. Condensing and cooling apparatus in which tubes or pipes containing or carrying the material to be cooled or condensed are immersed in a flowing stream of water, or in which cooling water is flowed over a series of such pipes or tubes may be cited as examples of such apparatus.

This invention involves the provision of an improved heat transferring and fluid distributing surface on the exterior of pipes or tubes in such heat transfer apparatus which has several important advantages and characteristics. The invention includes heat transfer pipes or tubes having such surfaces, elements adapted to provide such improved surfaces in conjunction with ordinary pipes or tubes, and heat transfer apparatus embodying pipes and tubes having such improved surfaces.

It has hitherto been proposed to provide heat transfer pipes or tubes with flanges, ribs, or corrugations to promote heat transfer by increasing the exposed area of the pipe or tube. Such proposals, however, have fallen short in that they have not provided to a sufficient extent for uniform distribution and thorough contacting of the heat transfer vehicle. In the ordinary type of atmospheric cooling pipe coils, there is no provision for uniform distribution of the cooling liquid other than that by which the cooling liquid is initially sprayed or flowed on the top pipe or pipes with resulting subsequent uneven distribution caused by air currents, the mechanical action of the pipe surface, or other causes. It is quite common to see water very nicely distributed over the top section of such atmospheric cooling coils but contacting with the lower section at only a few points. This, of course, is detrimental to the efficiency of the apparatus. Non-uniform distribution and inefficient use of the heat transfer surface similarly occurs in apparatus in which pipes or tubes of the usual type are immersed in a flowing stream of the heat transfer vehicle.

Among the principal factors involved in the efficiency of such apparatus are the distribution and contacting of the heat transfer vehicle with the surface of the pipes or tubes. Uniform distribution, thorough and intimate contacting, and effective use of all exposed surfaces are essential for high efficiency. One of the important purposes of this invention is to provide improved heat transfer pipes and tubes, and improved apparatus embodying such pipes and tubes, of high efficiency, in which uniform distribution and thorough contacting of the heat transfer vehicle with the pipes or tubes is effected, in which an improved heat transfer surface is provided, and in which effective use of a high proportion of the surface of the heat transfer tubes or pipes is secured.

The improved heat transfer surface of the present invention is the surface provided by convolutions or flanges in the general shape of fragments of a helix arranged along the heat transfer pipe or tube. According to the present invention, these convolutions or flanges advantageously approximate a single turn of a helix, and are arranged along the heat transfer pipe or tube with the equivalent part of each succeeding flange along the same element of the tube surface. The pipes or tubes are advantageously so disposed that the open ends of the helical fragments lie in the general direction of the flow of the heat transfer vehicle.

The improved heat transfer pipe or tube of the present invention comprises a pipe or tube having an external surface composed of a series of fragmentary helical convolutions or flanges arranged in spaced relation on the pipe or tube with the breaks in each convolution or flange disposed along the same side of the pipe or tube. The improved pipe or tube of the invention may be integral and may be cast in a single piece. Advantageously, however, the improved pipe or tube is composed of a pipe with a series of surface elements assembled thereon. The flanges or convolutions, with advantage, are spaced apart along the pipe or tube a distance about equal to the width of the base of the flange or convolution. In general configuration, the pipe or tube of the invention approximates a helix with alternate turns or portions thereof omitted.

The separable elements of the invention advantageously assume the shape of a single turn or convolution of a helix, but it is not essential that each element be exactly a single turn. The ends of the flanges or convolutions may overlap more or less and in this case the overlapping portions form a convenient and advantageous spacing of adjacent flanges. Flanges of less than a single turn may be employed, but in any case the flange should extend around the pipe or tube to a sufficient distance to be retained firmly thereon. The elements should be adapted to fit the pipe or tube snugly in order to attain good heat transfer through the assembled pipe or tube. The elements may be cast or may be fabricated in any convenient manner, for example, they may be stamped in circular form, one side of the element then cut and the element then pressed to helical shape.

In the assembled structure, the improved pipes or tubes of the invention should be so arranged that the center of the unbroken side of the helical flanges is disposed counter to the flow of the heat transfer vehicle with the open ends of the flanges directing the flow generally toward succeeding pipes and tubes. Distribution and contacting may be further promoted by staggering alternate pipes with respect to each other. In an atmospheric cooler or condenser, for example, a series of such improved pipes or tubes connected by return bends may be vertically arranged and cooling water flowed downwardly thereover. The improved surface effectively causes uniform distribution of the water and prevents it from flowing in a few channels and also provides an increased area for cooling of the coils and evaporation of the water flowing over the coils. Increased evaporation affords increased cooling with resultant gain in the efficiency of the coil and in economy of water. In the same manner, the efficiency of immersed coils is improved and formation of pockets of undisturbed and ineffective cooling fluid is eliminated or reduced.

The accompanying drawings illustrate an atmospheric condenser or cooler embodying the invention, but it will be understood that the invention is illustrated thereby and not limited thereto. In the drawing:

Fig. 1 is a diagrammatic view in elevation of a condenser or cooler according to this invention, Fig. 2 is a diagrammatic and fragmentary view from below of one of the tubes illustrated in Fig. 1, Fig. 3 is a transverse section illustrating one embodiment of the tubes shown in Fig. 1, and, Figures 4 and 5 show diagrammatic views from below of tubes fitted with modified forms of surface elements comprising fragmentary helical convolutions or flanges of more than a single turn and less than a single turn respectively.

The cooler or condenser illustrated comprises a series of heat transfer pipes 10 connected by return bends 11 and supported by frame work 12. Cooling liquid, usually water, is distributed over the coils through trough 13, which may be supplied through connection 14, flowing on to the first pipe over the serrated edge 15 of the trough 13.

Each of the heat transfer pipes 10 comprises a straight section of pipe or tube with a series of flanges 16 arranged along it in spaced relation. Each of these flanges or elements 16 consists of a single helical turn snugly fitting the pipe 10, the base of the flanges 16 being wider than the outer edge. The flanges 16 are spaced apart along the pipe 10 a distance approximately equal to the width of the base of the flange and the break in each flange is disposed along the lower edge of the pipe 10.

Water falling on each flange 16 or into the space between adjacent flanges from above is diverted into two streams and these two streams separately directed upon the next pipe below. Uniform distribution is thus secured and any tendency toward the formation of a few streams of comparatively large cross section is substantially eliminated. This distribution likewise is not effected to any substantial extent by any normal air current. The diversion and distribution of the water falling on the uppermost pipe is diagrammatically represented in the drawing which shows the approximate distribution of a single stream falling on the upper pipe at the point A. In its downward course over the successive pipes this stream, A, is diverted so that it leaves the fourth pipe distributed approximately over the space B—B.

Where the apparatus illustrated is employed for cooling a liquid, pipes or tubes of conventional internal cross section may be employed, such as ordinary cast iron or wrought iron pipe. Where the illustrated apparatus is employed for condensing vapors, ordinary pipes or tubes may be used or pipe having a cross-section such as is illustrated in Fig. 3 may be used with advantage. In the pipe section illustrated in Fig. 3, a series of longitudinal ribs 17 are provided projecting into the vapor space on the interior of the tube 10. These longitudinal ribs do not materially retard the flow of the vapors but they provide an increased area for heat transfer to the vapors. By omitting the ribs in the lower half of the tube, the transfer of heat to the condensate is not increased and the maximum cross sectional area for draining of condensate from the coils is provided.

One application to which the improved apparatus of this invention is particularly applicable is the condensation and cooling of hydrocarbon vapors and gases, or other vapor mixtures condensing over a wide range of temperature, such as the vapors evolved by distillation in the refining or cracking of petroleum oils. The apparatus to condense vapors at any required rate is very compact, and, due to the efficiency of the apparatus of the invention, any losses due to uncondensed vapors are very low. Efficient cooling and condensation are also effected without material obstruction of the vapor flow.

The invention has been particularly described in connection with circular pipes or tubes, but it will be apparent that pipes or tubes of other external section may be employed. With pipes or tubes of any external section, the flanges should conform to the external configuration of the tubes and should be in the general shape of helical fragments.

It will also be apparent that the invention can be employed in conjunction with cooling fluids other than liquids. The improved surface provided by this invention also affords improved distribution and contacting of gases passing over the surface of the heat transfer elements. In such applications, the open ends of the flanges should be disposed in the general direction of flow of the gases passing over the pipes or tubes.

While the invention has been particularly described in connection with condensing and cooling apparatus, the improved surface of the invention is also applicable to improvement of the distribution and contacting of heating fluids passing over tubular elements through which heat is transferred to the interior. The invention may be employed in conjunction with either gaseous or liquid heating fluids. In applications of this class, the flanges should be so disposed as to break up and divert the moving stream of fluid passing over the pipes or tubes.

It will thus be seen that the present invention provides improved heat transfer surfaces and apparatus which afford several important advantages. The surface elements and pipes and tubes, and apparatus of the invention promote the efficiency of heat transfer and permit increased capacity or reduction in size of heat transfer apparatus of the class described. The structures of the invention are simple and can be easily repaired or elements thereof easily replaced. The improved pipes and tubes and improved surface elements are inexpensive and are readily fabricated.

I claim:

1. An improved heat transfer pipe or tube having an external surface comprised of a series of fragmentary helical convolutions or flanges spaced along the pipe or tube to form an interrupted helix.

2. An improved heat transfer pipe or tube having an external surface comprised of a series of fragmentary helical convolutions or flanges with corresponding points in each flange or convolution disposed along the same longitudinal element in the surface of the pipe or tube.

3. An improved heat transfer pipe or tube having an external surface comprised of a series of fragmentary helical convolutions or flanges, each flange or convolution being spaced from adjacent flanges or convolutions a distance approximately equal to the width of the base of the flange or convolution.

4. An improved heat transfer pipe or tube having an external surface in the general shape of a helix having portions of alternate turns thereof omitted.

5. An improved heat transfer pipe or tube having an external surface comprised of a series of helical convolutions or flanges constituting approximately a single turn of a helix, the break in each flange or convolution being disposed along the same side of the pipe or tube.

6. An improved surface element for heat transfer pipes or tubes comprising a fragmentary helical convolution or flange having a pitch approximately equal to the width of its base and adapted to fit snugly a pipe or tube of predetermined size and shape.

7. An improved surface element for heat transfer pipes or tubes consisting of approximately a single turn of a helical convolution or flange adapted to fit snugly a pipe or tube of predetermined size and shape.

8. An improved heat transfer apparatus comprising a series of pipes or tubes having an external surface composed of a series of fragmentary helical convolutions or flanges and means to flow a heat transfer vehicle thereover, the open ends of the convolutions or flanges on the pipe or tube being disposed in the general direction of the flow of the heat transfer vehicle.

9. An improved heat transfer apparatus comprising a pipe or tube having an external surface composed of a series of fragmentary helical convolutions or flanges with corresponding points in each flange or convolution disposed along the same longitudinal element in the surface of the pipe or tube and means to flow a heat transfer vehicle thereover, the open ends of the convolutions or flanges on the pipe or tube being disposed in the general direction of the flow of the heat transfer vehicle.

10. An improved heat transfer apparatus comprising a series of pipes or tubes having an external surface composed of a series of fragmentary helical convolutions or flanges and an internal surface comprising longitudinal ribs in the upper portion thereof and means to flow a heat transfer vehicle thereover.

11. An improved heat transfer apparatus comprising a vertically arranged series of pipes or tubes having an external surface composed of a series of fragmentary helical convolutions or flanges with the open ends of the flanges or convolutions downwardly directed, and means to flow a cooling liquid thereover.

In testimony whereof I affix my signature.

CLIVE MORRIS ALEXANDER.